United States Patent [19]
Schluger

[11] Patent Number: 5,518,488
[45] Date of Patent: May 21, 1996

[54] CD HOLDER OF CARDBOARD AND METHOD OF CONSTRUCTION

[76] Inventor: Allen Schluger, 21 W. 68th St., New York, N.Y. 10023

[21] Appl. No.: 407,273

[22] Filed: Mar. 20, 1995

[51] Int. Cl.[6] ............................. B31B 3/14; B31B 3/74
[52] U.S. Cl. ................ 493/82; 493/69; 493/79; 493/83; 493/356
[58] Field of Search ..................... 493/69, 71, 72, 493/82, 83, 151, 342, 355, 356, 361, 362, 373, 79; 206/308.1, 312, 313; 83/13, 40, 55, 667, 681, 682, 684

[56] References Cited

U.S. PATENT DOCUMENTS

| | | | |
|---|---|---|---|
| 2,077,570 | 4/1937 | Lamare | 493/82 |
| 3,567,103 | 3/1971 | Seifert | 229/14 |
| 3,595,383 | 7/1971 | Boylan | 206/62 |
| 3,927,767 | 12/1975 | Sato et al. | 206/521 |
| 5,188,229 | 2/1993 | Bernstein | 206/308.1 |

*Primary Examiner*—Jack W. Lavinder
*Assistant Examiner*—Allyson Abrams

[57] ABSTRACT

As a substitute for a plastic so-called "jewel box" holder for a compact disc (CD), a holder entirely of biodegradable cardboard construction material (1) fabricated from a blank (2) delineated into panels (3) folded into a multi-ply configuration having a compartment for the CD (4) die-cut out of the configuration using a so-called "kiss cut" which provides the compartment sized and shaped to have the CD seated therein on a bottom compartment closure provided by one of the panels left intact using the "kiss cut" die-cut, such that the attributes and fabrication options of cardboard construction material are used to maximum advantage.

2 Claims, 3 Drawing Sheets

5,518,488

CD HOLDER OF CARDBOARD AND METHOD OF CONSTRUCTION

The present invention relates generally to a Holder for a Compact Disc (CD) fabricated entirely out of cardboard construction material, and thus obviating the use of plastic or other such non-biodegradable materials, and more particularly to the use of cardboard without detracting from providing an effectively functioning enclosure or holder for the CD for transporting, mailing or merely storing inbetween use this fragile product, and thus effectively substituting for the heretofore rigid plastic CD holder popularly known as a "jewel box".

EXAMPLE OF THE PRIOR ART

In U.S. Pat. No. 5,085,318 issued to Leverick for "Secured Disc Folder" on Feb. 4, 1992, the shortcoming of using a plastic container for a CD holder is similarly acknowledged and, as similarly proposed herein, a cardboard substitute is proposed for the plastic container. However, the Leverick CD enclosure or holder is not fabricated out of the cardboard in a manner which uses to advantage the attributes of cardboard to make up for the lack of strength and rigidity this material possesses in relation for the substituted plastic, with the result that the cardboard Leverick CD holder is not effective for the purposes intended, namely to protect the fragile CD against surface damage, shape distortion and the like, during transporting, mailing or storage during inbetween use of the CD.

Broadly, it is an object of the present invention to provide a cardboard CD holder overcoming the foregoing and other shortcomings of the prior art.

More particularly, it is an object to provide a CD holder effectively enclosing the CD in a multi-ply cardboard structure which resists compressive forces as might cause damage to the CD to an even greater extent than rigid plastic, and in other ways contributes to better serving as a protective container for the CD, all as will be better understood as the description proceeds.

The description of the invention which follows, together with the accompanying drawings should not be construed as limiting the invention to the example shown and described, because those skilled in the art to which this invention appertains will be able to devise other forms thereof within the ambit of the appended claims.

The patentable advance herein disclosed and illustrated is a holder, generally designated 10, intended primarily for transporting, mailing, or merely storing inbetween use, without causing damage to a musical or sound-playing component consisting of a compact disc and popularly known by its acronym CD. As further well known a CD, herein designated 12 and shown in FIG. 1 in phantom, is commercially available in a circular shape of approximately 4 11/16 inches in diameter and a thickness of 1/32 inches.

Figure 1:
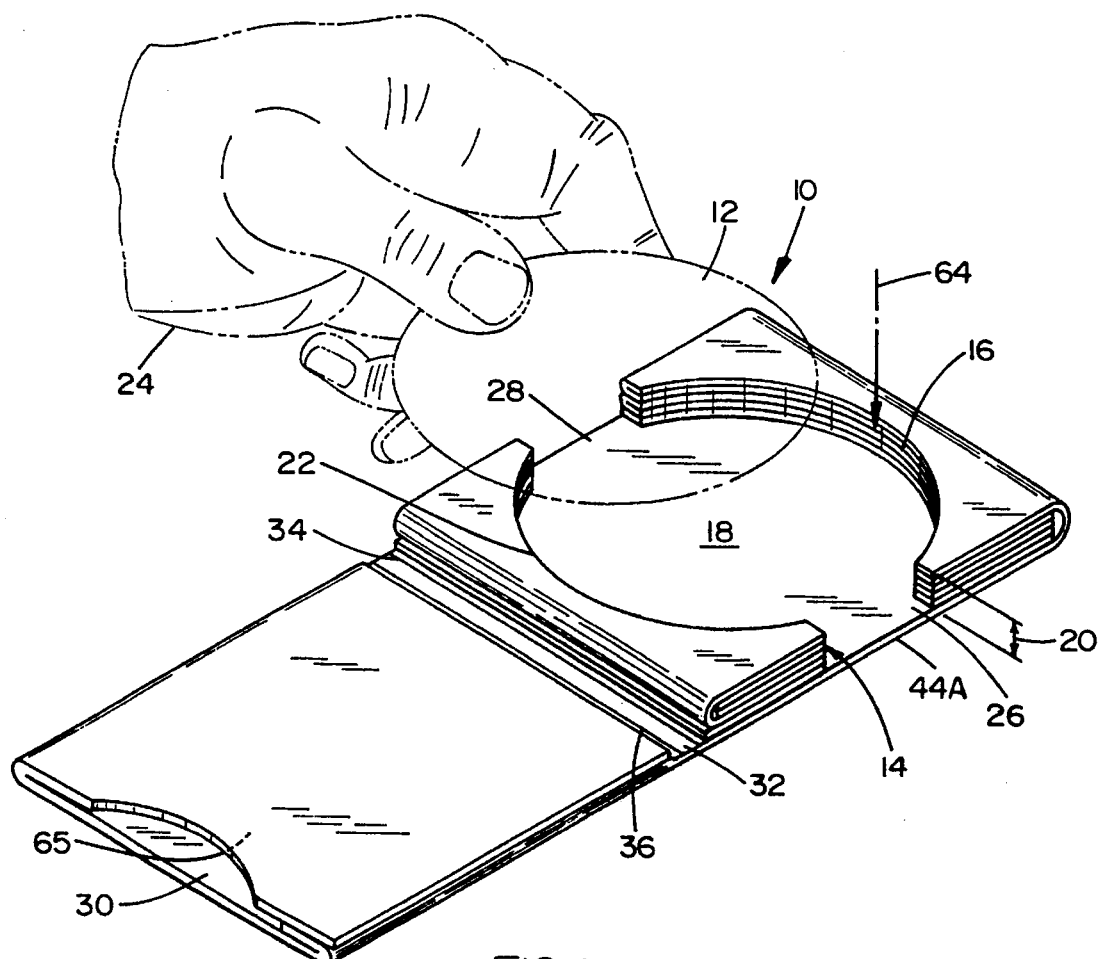
FIG. 1 is a perspective view of an open cardboard CD holder according to the present invention.

The within inventive holder 10 as shown in its folded or three dimensional configuration in FIG. 1 is a construction exclusively of panels of cardboard construction material, i.e. avoiding any plastic or other such non-biodegradable material, which presents a superposed arrangement of plies, individually and collectively designated 14 which cooperate in forming a wall 16 bounding a CD storage compartment 18. Wall 16 has a height 20, shown in slightly exaggerated proportion in FIG. 1, and similarly shown in slightly exaggerated proportion is the compartment 18 having a 4 11/16 inches diameter. The CD 12 having the dimensions above noted is thus sized and shaped to be seated with a slight friction fit about its peripheral edge 22 to the wall 16 when placed by a user 24 into the compartment 18. Openings 26 and 28 are provided for handling of the CD 12 during placement into and removal from the compartment 18 at the CD edges aligning with the openings 26 and 28.

Figure 2:
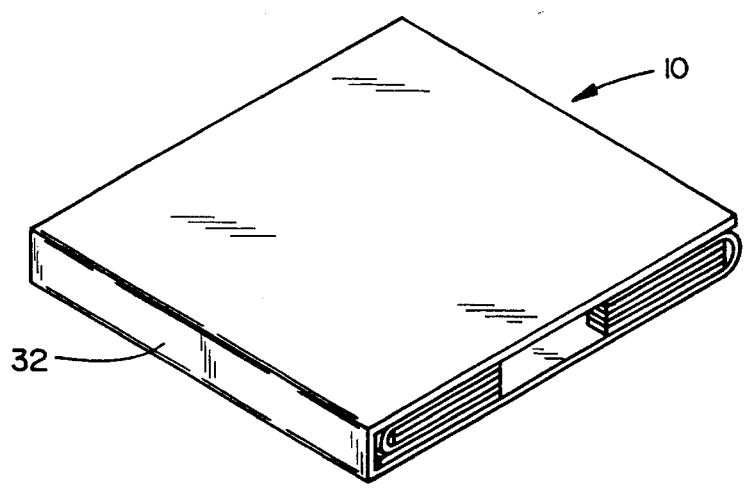
FIG. 2 is a perspective view illustrating the compact closed condition of the CD holder.

Still referring to FIG. 1, it will be noted that holder 10 is further embodied with a laterally extending literature-enclosing pocket 30 and, more pertinent to the inventive advance represented by the holder 10 has, in a narrow connecting strip 32 two adjacent fold lines 34 and 36 which contribute to the strip 32 functioning as a spine of a book when the pocket 30 panel construction is folded over the CD seated in the compartment 18. The resulting compact booklike configuration of the holder 10 is best understood from FIG. 2.

The fabrication of the holder 10 is illustrated in sequence in FIGS. 3 through 6. More particularly, preliminarily there is die-cut from cardboard stock, preferably solid bleach sulphate which is commercially available from Westvaco of New York, N.Y., a blank 38 which is delineated by fold lines, individually and collectively designated 40, into eight panels, designated in accordance with their co-operating relationship with each other as sets, as 42 and 42A, as 44 and 44A, as 46 and 46A, and as 48 and 48A. In the previously described folded configuration of FIG. 1, panel 44A is the bottom of the compartment 18 and panel 46A the top ply, and the designated panels 44, 46 and 48 and 48A the superposed construction which results in the wall 16. The remaining panels 42, 42A, along with a sealing tab 50 provide the pocket 30.

Figure 3:
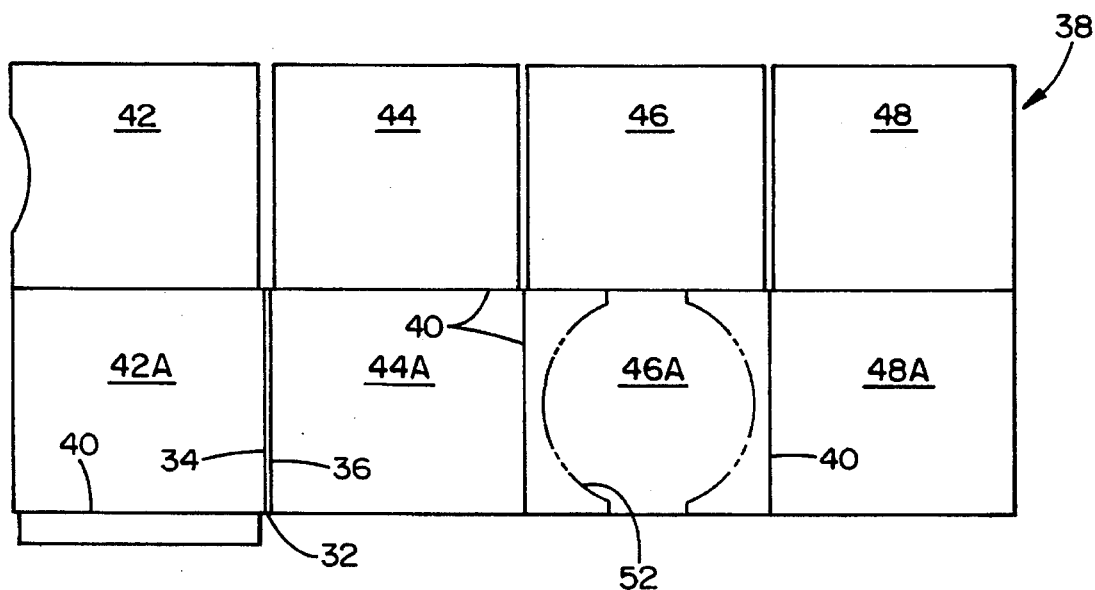
FIG. 3 is a plan view of a cardboard blank used in the fabrication of the CD holder.

Although in the condition of a flat blank 38 as shown in FIG. 3 there is not yet any removal of any cardboard by die-cutting as would provide the CD-shaped compartment 18 for enhancement in understanding of the contribution of this method step subsequently to be practiced, on panel 46A there is shown in phantom and designated 52 the die-cut location and the size relation of the die-cut relative to the size of panel 46A.

Figure 4:
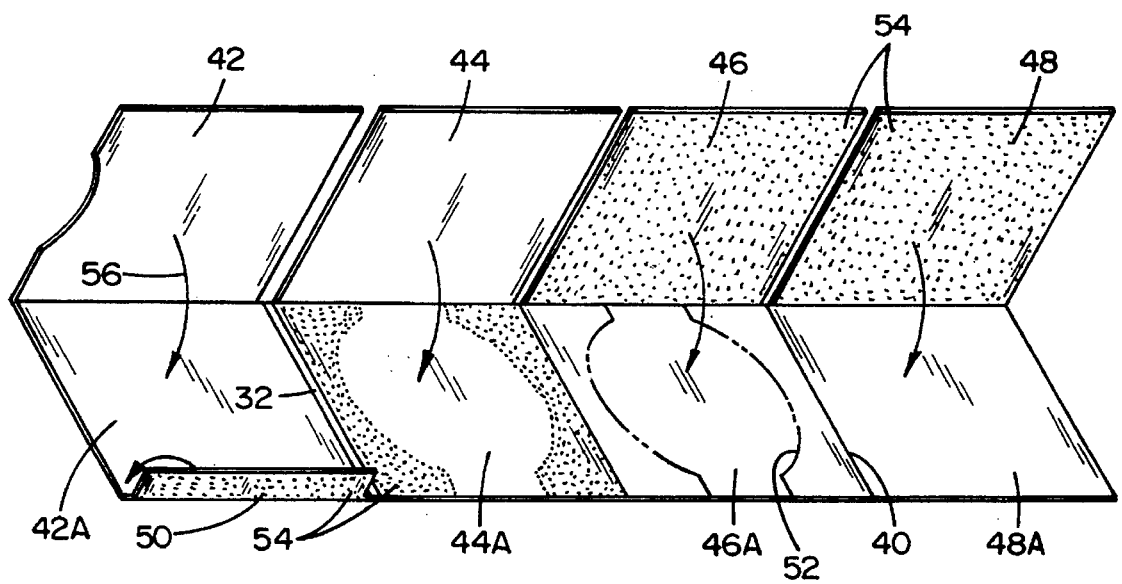
FIG. 4 is a perspective view of the blank of FIG. 3 being folded into the within CD holder.

In the fabrication of holder 10 and proceeding next to FIG. 4, adhesive is applied in any known appropriate manner to the surfaces of the panels in the areas illustrated individually and collectively designated 54, thus covering the entire surfaces of panels 46 and 48, the peripheral surface of bottom panel 44A, and the surface of the sealing tab 50, after which the panels are then folded in accordance with the directional arrows 40 to form, starting from left to right as viewed in FIG. 4, the pocket 30, and successively a two-ply construction of panels 44 and 44A, separated by the strip 32 from the pocket 30, a two-ply construction of panel 46 and top panel 46A delineated by fold line 56 from the panels 44, 44A, and a two-ply construction of panels 48 and 48A delineated by fold line 56 from the panels 46, 46A.

Figure 5:
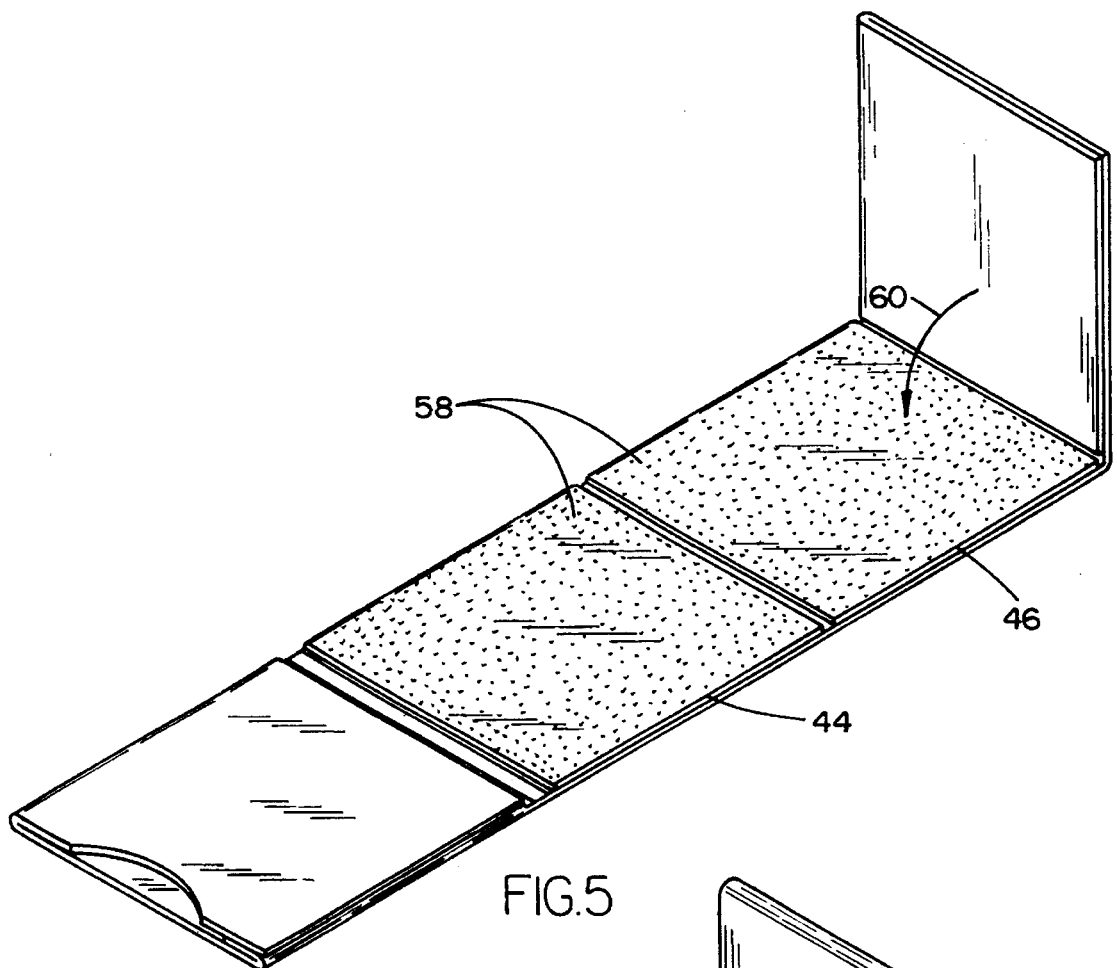
FIGS. 5 and 6 are each perspective views illustrating subsequent folding of the blank.
Figure 6:
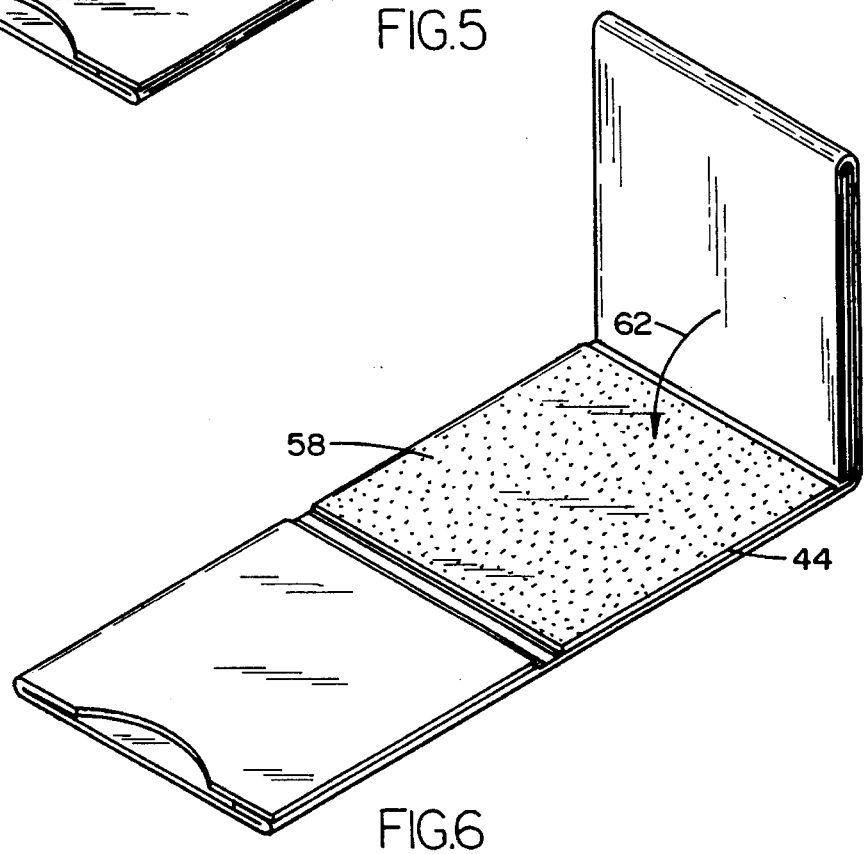

Proceeding next to FIGS. 5 and 6, the within inventive method contemplates applying adhesive 58 to the exposed opposite surfaces of panels 44 and 46, and then folding the panels according to the directional arrows 60 and 62.

Returning again to FIG. 1, there results after the folding step of FIG. 6, a superposed arrangement of plies 14 above the bottom panel 44A in proper condition for the die-cutting and removal of cardboard construction material that will provide the compartment 18. This die-cutting and selective material removal is achieved in a well understood manner using die-cutting equipment, such as is commercially available from Bobst S. A. of Lausanne, Switzerland, to impart a so-called "kiss cut" die-cut in the superposed plies 14, said "kiss cut" die-cut being denoted by the reference arrow 64 indicating a descending cutting action into the plies along the location 52 previously noted in FIG. 3 which imparts the desired shape to the resulting compartment 18 and, most important, said die-cut is only carried out to the depth of all but the bottom panel 46A and thus leaves intact the bottom panel 46A so it can serve as a support surface for the CD 12 positioned in the compartment 18.

For completeness sake, it is noted that when the holder 10 is commercially used as for mail order or retail sales of CDs, that descriptive literature (not shown) will be placed through an opening 65 into the pocket 30.

While the apparatus for practicing the within inventive method, as well as said method herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

What is claimed is:

1. A method of fabricating a holder entirely of cardboard construction material of a type for a circular CD disc of $4^{11}/_{16}$ inch diameter, said fabricating method comprising the steps of die-cutting from a substrate of cardboard a blank having a select number of panels of rectangular shape, folding said panels of said blank into a superposed arrangement over a bottom panel ply, die-cutting a circular shape sized to accommodate a CD disc in said superposed panels plies so as to leave intact said bottom panel ply, removing the circular shaped die-cut panels from said superposed arrangement so as to form a compartment with remaining superposed panels for a seated placement therein of said CD disc, whereby said remaining superposed panels contribute to securing said CD disc within said compartment.

2. The holder-fabricating method of claim 1 including providing an additional panel extending laterally of said bottom panel, and delineating spaced apart fold lines at adjacent locations of said additional and bottom panels, whereby said additional panel is adapted to fold over said seated CD disc to serve as a closure for said compartment and said spaced-apart fold lines form a book-like spine which contributes to a compact rectangular condition for said holder.

\* \* \* \* \*